(12) United States Patent
Ramalingam et al.

(10) Patent No.: US 12,411,814 B2
(45) Date of Patent: Sep. 9, 2025

(54) METADATA BASED MAPPING ASSIST

(71) Applicant: International Business Machines Corporation, Armonk, NY (US)

(72) Inventors: Ramkumar Ramalingam, Theni (IN); Subhojeet Pramanik, Kolkata (IN); Jothiponsundar Radhakrishnan, Bangalore (IN); Saptarshi Misra, Kolkata (IN); Nagarjuna Surabathina, Prakasam district (IN); Matu Agarwal, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 417 days.

(21) Appl. No.: 17/110,435

(22) Filed: Dec. 3, 2020

(65) Prior Publication Data

US 2022/0179833 A1 Jun. 9, 2022

(51) Int. Cl.
*G06F 16/21* (2019.01)
*G06F 16/22* (2019.01)
(Continued)

(52) U.S. Cl.
CPC .......... *G06F 16/211* (2019.01); *G06F 16/221* (2019.01); *G06F 16/2237* (2019.01);
(Continued)

(58) Field of Classification Search
CPC .. G06F 16/211; G06F 16/2237; G06F 16/287; G06F 16/24573; G06F 16/221;
(Continued)

(56) References Cited

U.S. PATENT DOCUMENTS

| 8,442,999 | B2 | 5/2013 | Gorelik |
| 8,954,375 | B2 | 2/2015 | Kehoe |

(Continued)

FOREIGN PATENT DOCUMENTS

| CN | 109858032 A | * | 6/2019 |
| CN | 110532399 A | * | 12/2019 |

OTHER PUBLICATIONS

"Anypoint Platform—One platform for APIs and integrations", MuleSoft, retrieved from the internet on Aug. 17, 2020, 7 pages, <https://www.mulesoft.com/platform/enterprise-integration>.
(Continued)

*Primary Examiner* — William P Bartlett
(74) *Attorney, Agent, or Firm* — Joseph P. Curcuru (57) ABSTRACT

Methods, computer program products, and/or systems are provided that perform the following operations: obtaining source schema metadata, wherein the source schema metadata is associated with fields of a source schema; obtaining target schema metadata with a target schema, wherein the target schema metadata is associated with fields of a target schema; determining, for each field of the source schema and each field of the target schema, a representation for each field based, at least in part, on the source schema metadata or the target schema metadata associated with each field; and providing the representation for each field of the source schema and each field of the target schema for use in generating data mappings between the source schema and the target schema.

18 Claims, 7 Drawing Sheets

(51) Int. Cl.
　　　*G06F 16/2457*　　(2019.01)
　　　*G06F 18/214*　　(2023.01)
　　　*G06F 18/22*　　(2023.01)
　　　*G06N 3/044*　　(2023.01)
　　　*G06N 3/08*　　(2023.01)

(52) U.S. Cl.
　　　CPC ...... *G06F 16/24573* (2019.01); *G06F 18/214* (2023.01); *G06F 18/22* (2023.01); *G06N 3/044* (2023.01); *G06N 3/08* (2013.01)

(58) Field of Classification Search
　　　CPC .... G06F 16/2282; G06K 9/6215; G06N 3/08; Y10S 707/99955
　　　See application file for complete search history.

(56) References Cited

U.S. PATENT DOCUMENTS

| | | | | |
|---|---|---|---|---|
| 2004/0205573 | A1* | 10/2004 | Carlson | G06F 40/143 715/237 |
| 2019/0286978 | A1 | 9/2019 | Aggarwal | |
| 2019/0318272 | A1* | 10/2019 | Sassin | G06F 16/254 |
| 2020/0051550 | A1* | 2/2020 | Baker | G06N 20/20 |
| 2020/0081899 | A1 | 3/2020 | Shapur | |
| 2020/0104746 | A1* | 4/2020 | Strope | G06N 5/04 |
| 2020/0334520 | A1* | 10/2020 | Chen | G06F 40/216 |
| 2021/0126881 | A1* | 4/2021 | Ball | G06F 40/216 |
| 2021/0232908 | A1* | 7/2021 | Xian | G06N 3/08 |
| 2022/0100772 | A1* | 3/2022 | Kadarundalagi Raghura | G06F 16/2358 |

OTHER PUBLICATIONS

"Boomi Suggest and Your Privacy", boomi, A Dell Technology Business, retrieved from the Internet on Aug. 17, 2020, 2 pages, <https://boomi.com/privacy/suggest/>.

"Facebookresearch / InferSent", GitHub, retrieved from the Internet on Aug. 19, 2020, 3 pages, <https://github.com/facebookresearch/InferSent>.

"IBM Cloud Pak for Integration 2020.2.1 adds support for IBM Cloud Transformation Advisor and IBM App Connect Enterprise Mapping Assist", IBM United States Software Announcement 220-300 Jun. 23, 2020, 10 pages, Grace Period Disclosure document.

"Schema Matching using Machine Learning", Author Identity hidden due to Anonymous Submission, 7 pages, provided by the inventors on Jun. 1, 2020, <https://pdfs.semanticscholar.org/0786/c8586bc4f3491a394b07975b7d7780a1ce3a.pdf>.

"The Stanford Natural Language Inference (SNLI) Corpus", The Stanford Natural Language Processing Group, retrieved from the Internet on Aug. 17, 2020, 7 pages, <https://nlp.stanford.edu/projects/snli/>.

Agarwal, Matu, "IBM App Connect 'Mapping Assist'—Putting AI to Work for Your Business", Published on Jun. 24, 2020 / Updated on Jun. 26, 2020, 6 pages, <https://developer.ibm.com/integration/blog/2020/06/24/ibm-app-connect-mapping-assist-putting-ai-to-work-for-your-business/>, Grace Period Disclosure document.

Berlin et al., "Database Schema Matching Using Machine Learning with Feature Selection", CAISE 2002, LNCS 2348, pp. 452-466, 2002, A. Banks Pidduck et al. (Eds.), <https://link.springer.com/content/pdf/10.1007%2F3-540-47961-9_32.pdf>.

Conneau et al., "Supervised Learning of Universal Sentence Representations from Natural Language Inference Data", arXiv:1705.02364v5 [cs.CL] Jul. 8, 2018, 12 pages.

Fatima, Nida, "Understanding Data Mapping and its Techniques", Astera, Aug. 7, 2020, 6 pages.

Heinzerling et al., "BPEmb: Subword Embeddings in 275 Languages", 2018, 5 pages, <https://nlp.h-its.org/bpemb/>.

Lu et al., "A Deep Architecture for Matching Short Texts", Advances in Neural Information Processing Systems 26 (NIPS 2013), 10 pages, <http://www.hangli-hl.com/uploads/3/4/4/6/34465961/nips_2013.pdf>.

Rahm et al., "A survey of approaches to automatic schema matching", The VLDB Journal 10: pp. 334-350 (2001), Digital Object Identifier (DOI) 10.1007/s007780100057, Published online: Nov. 21, 2001—copyright Springer-Verlag 2001.

Rahm et al., "On Matching Schemas Automatically", Microsoft Research, Microsoft Corporation, Feb. 2001, Technical Report MSR-TR-2001-17, 22 pages.

\* cited by examiner

METADATA BASED MAPPING ASSIST

STATEMENT ON PRIOR DISCLOSURES BY AN INVENTOR

The following disclosure(s) are submitted under 35 U.S.C. § 102(b)(1)(A):

(1) IBM, "IBM Cloud Pak for Integration 2020.2.1 adds support for IBM Cloud Transformation Advisor and IBM App Connect Enterprise Mapping Assist", IBM United States Software Announcement 220-300, Jun. 23, 2020, 10 pages.

(2) Matu Agarwal, "IBM App Connect 'Mapping Assist'—Putting AI to Work for Your Business", Published on Jun. 24, 2020/Updated on Jun. 26, 2020, 6 pages, https://community.ibm.com/community/user/middleware/viewdocument/ibm-app-connect-mapping-assist-p.

BACKGROUND

The present invention relates generally to the field of data/schema mapping, and more particularly to providing for data mapping using schema matching that is based on metadata available in a schema.

In general, data or schema mapping is the process of mapping data fields from a source file to related target fields. Mapping tasks vary in complexity, for example, depending on the hierarchy of the data being mapped, as well as the disparity between the structure of the source and the target. Applications often use metadata to explain the data fields and attributes that comprise the data. Generally, each field in a schema can include various meta-data, such as field name, display name, description, data type, source schema name, and the like.

SUMMARY

According to an aspect of the present invention, there is a method, computer program product and/or system that performs the following operations (not necessarily in the following order): obtaining source schema metadata, wherein the source schema metadata is associated with fields of a source schema; obtaining target schema metadata with a target schema, wherein the target schema metadata is associated with fields of a target schema; determining, for each field of the source schema and each field of the target schema, a representation for each field based, at least in part, on the source schema metadata or the target schema metadata associated with each field; and providing the representation for each field of the source schema and each field of the target schema for use in generating data mappings between the source schema and the target schema.

DETAILED DESCRIPTION

According to aspects of the present disclosure, systems and methods can be provided to generate representations for fields in a schema and assist in generating data mappings between fields of a source schema and fields of a target schema. In particular, systems and methods of the present disclosure can provide for training a machine learning model to generate a fixed size vector representation for each field in a schema based on multi-modal information from all of the metadata columns associated with the field. The systems and methods of the present disclosure can provide for calculating field-to-field similarity between fields in a source schema and fields in a target schema. The systems and methods of the present disclosure can provide for independently passing the metadata for each field to the machine learning model to generate a representation for each field. These representations can be used to calculate an overall confidence score between two fields and these confidence scores can be used in generating data mapping suggestions between the source schema and the target schema, for example, by filtering the fields with the highest confidence scores.

Typically, businesses may rely on platforms that can instantly connect applications, data, heritage systems, and modern technologies through a variety of integration styles—from traditional service-oriented architectures to modern, agile, and event-driven ones. With such platforms, users can build integration flows that define how data is moved from one application to one or more other applications, whether the applications are on the cloud or a private network.

Often, the most time-consuming activity while developing integration flow can be data mapping. Typical business use cases may require developing around hundreds of integration flows making use of a wide variety of connectors available in a platform. In general, businesses could spend around five to six months in developing these hundreds of integration flows using tools that allow them to map data between source schemas and target schemas as required by their integration use cases.

Data or schema mapping is the process of mapping data fields from a source file to their related target fields. Mapping tasks may vary in complexity, depending on the hierarchy of the data being mapped, as well as the disparity between the structure of the source and the target. In general, business applications, whether on-premise or cloud, use metadata to explain the data fields and attributes that comprise the data. Each field in a schema can include various metadata, such as field name, display name, description, data type, source schema name, and/or the like, as one example.

Accordingly, embodiments of the present disclosure can provide for automatically generating data mapping suggestions for given source and target schemas based on metadata available in the schemas (e.g., field name, display name, description, etc.) and without accessing the actual data of the schemas during flow development. Additionally, embodiments of the present disclosure can provide for suggesting data mappings that do not depend on suggestions from solving similar use cases of other users.

This Detailed Description section is divided into the following sub-sections: The Hardware and Software Environment; Example Embodiments; Further Comments and/or Embodiments; and Definitions.

The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
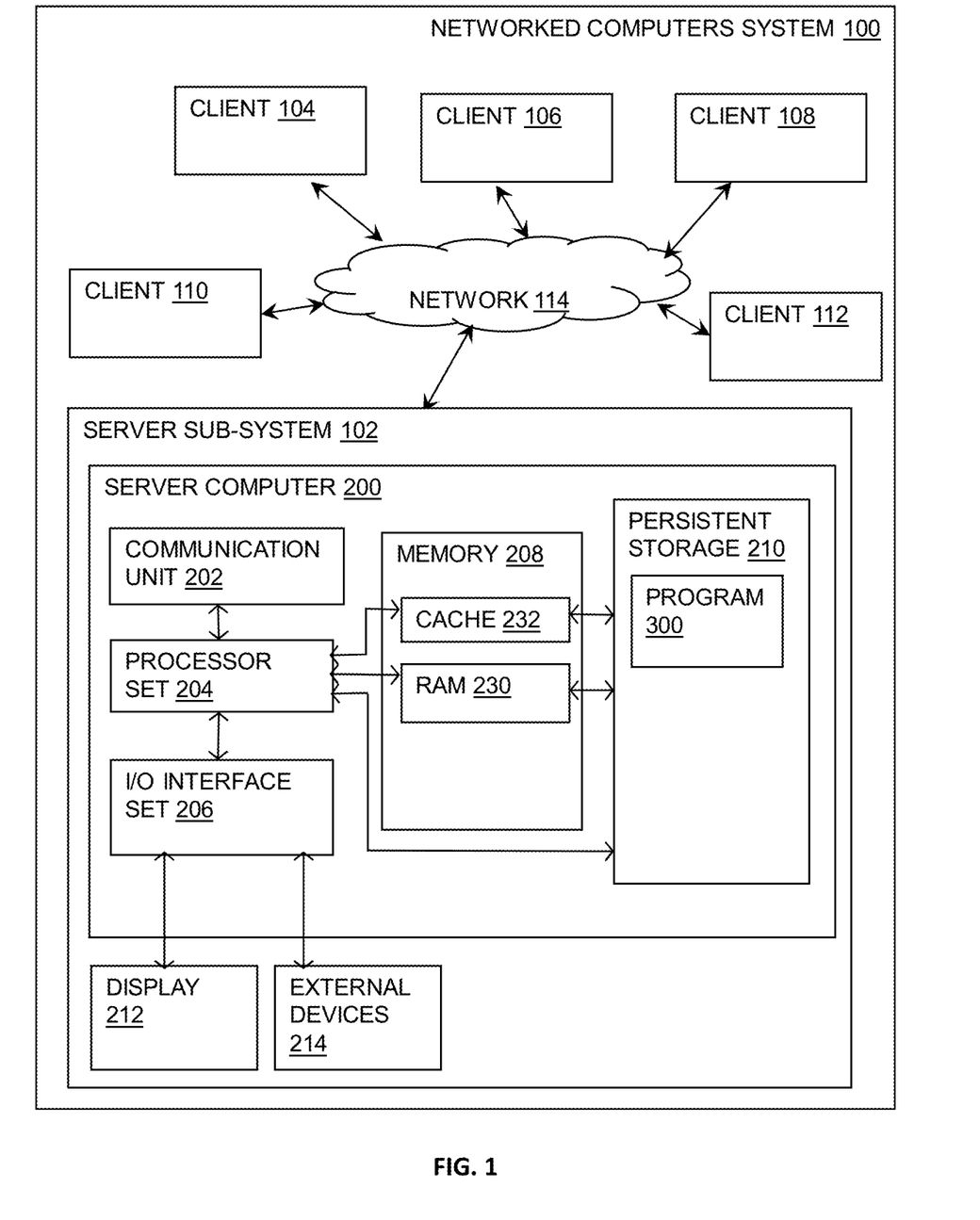
FIG. 1 is a block diagram view of a first embodiment of a system, according to the present invention.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine-readable instructions and/or data that can be used to create, manage, and control certain software functions, such as will be discussed in detail, below, in the Example Embodiment sub-section of this Detailed Description section. As an example, a program 300 can comprise training machine learning models for data mapping, generating vector representations of schema fields based on metadata, calculating field similarities between a source schema and a target schema, generating data mapping suggestions between a source schema and a target schema, and/or the like.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). For example, program 300 may include machine readable and performable instructions to provide for performance of method operations as disclosed herein. In this particular embodiment, persistent storage 210 includes a magnetic hard disk drive. To name some possible variations, persistent storage 210 may include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor, a smart phone/tablet display screen, and/or the like.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Example Embodiments

Figure 2A:
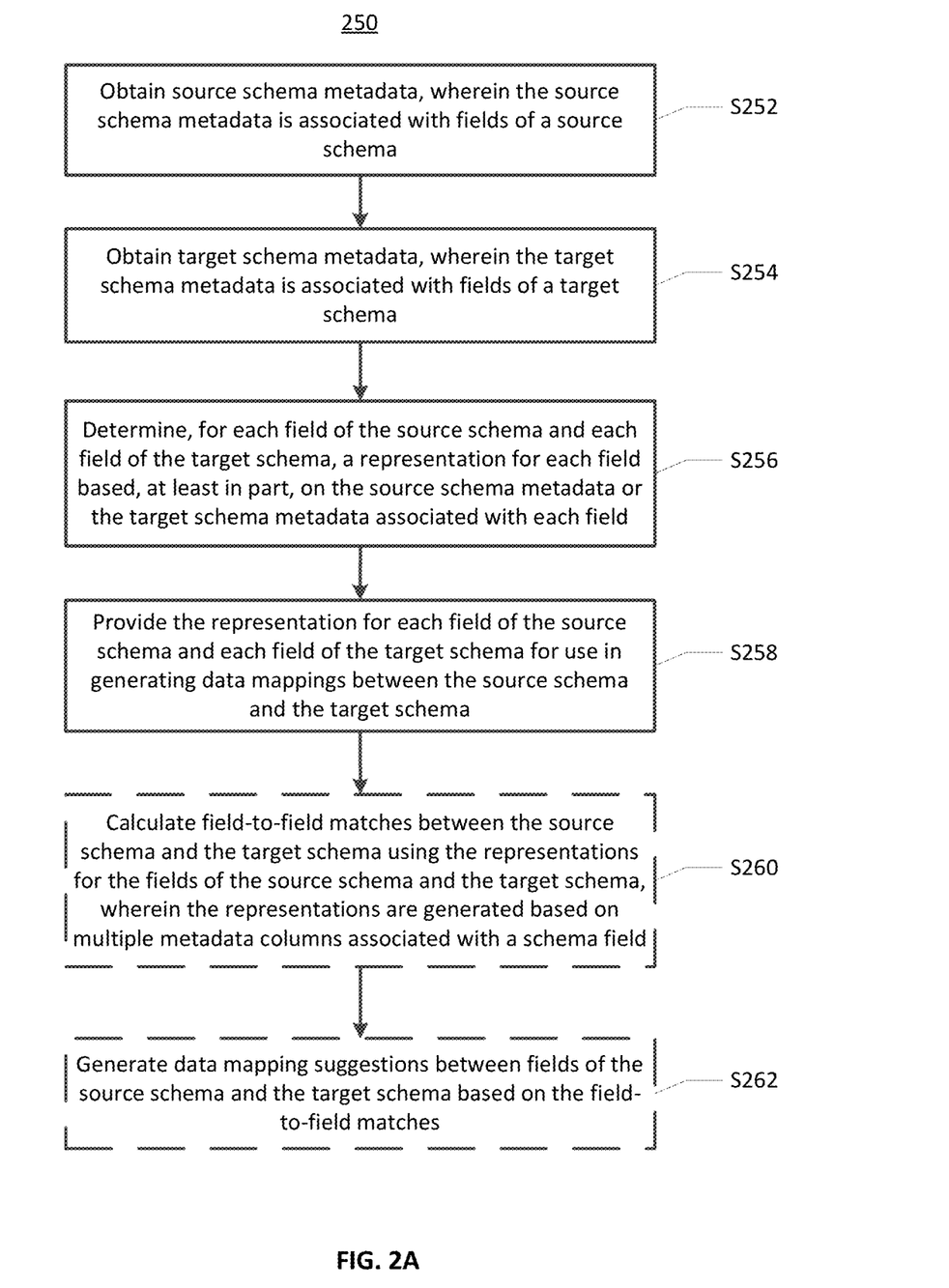
FIGS. 2A-2B are flowcharts showing embodiments of a method performed, at least in part, by the first embodiment system.

FIG. 2A shows flowchart 250 depicting a computer-implemented method for generating schema field representations for use in data mapping, according to embodiment(s) of the present invention. Regarding FIG. 2A, one or more flowchart blocks may be identified with dashed lines and represent optional steps that may additionally be included, but which are not necessarily required, in the depicted embodiments.

As illustrated in FIG. 2A, in some embodiments, operations for determining effective deployments (e.g., cloud deployments, etc.) begin at operation S252, where a computing system (e.g., server computer 200 of FIG. 1 or the like) obtains source schema metadata. The source schema metadata can be associated with a plurality of fields of the source schema.

Processing proceeds to operation S254, where the computing system (e.g., server computer 200 of FIG. 1 or the like) obtains target schema metadata. The target schema metadata can be associated with a plurality of fields of the target schema.

Processing proceeds to operation S256, where the computing system (e.g., server computer 200 of FIG. 1 or the like) determines a representation for each field of the source schema and for each field of the target schema. The representation for each field is generated based, at least in part, on the source schema metadata associated with the field or the target schema metadata associated with the field.

In some embodiments, determining a representation for each field of the source schema and each field of the target schema can include the computing system individually providing the metadata associated with each field of the source schema or the target schema as input to a machine learning model that has been trained to generate a representation for each of the fields based on one or more metadata columns associated with that particular. The computing system can then obtain, as output from the machine learning model, a vector representation for each field. The vector representation for each field can describe a combination of metadata columns associated with that field and be used as the representation for that field in determining matches between fields of the source and target schemas for use in data mapping. In some embodiments, the machine learning model can be trained to identify relevant information from multiple metadata columns associated with a schema field to use in generating a single vector representation for the schema field.

Processing proceeds to operation S258, where the computing system (e.g., server computer 200 of FIG. 1 or the like) can provide the individual representation for each field of the source schema and for each field of the target schema to assist in generating data mappings between the source schema and the target schema. In some embodiments, the representation for each field of a schema (e.g., source schema, target schema, etc.) can be a fixed size vector embedding that describes a combination of some or all of the metadata associated with that particular field. In some embodiments, schema field representations can be generated for dynamic object schema. For example, many customer relationship management (CRM) solutions (e.g., cloud-based, etc.) allow users to create their own objects and/or allow extending schemas of an existing object.

Optionally, in some embodiments, processing may proceed to operation S260, where the computing system (e.g., server computer 200 of FIG. 1 or the like) can calculate field-to-field matches between the fields of the source schema and the fields of the target schema using the generated field representations for the fields of the source schema and the fields of the target schema. In some embodiments, the field representations can be generated based on multiple metadata columns associated with the schema field.

Optionally, in some embodiments, processing may proceed to operation S262, where the computing system (e.g., server computer 200 of FIG. 1 or the like) can generate data mapping suggestions between the fields of the source schema and the fields of target schema based on the field-to-field matches.

Figure 2B:
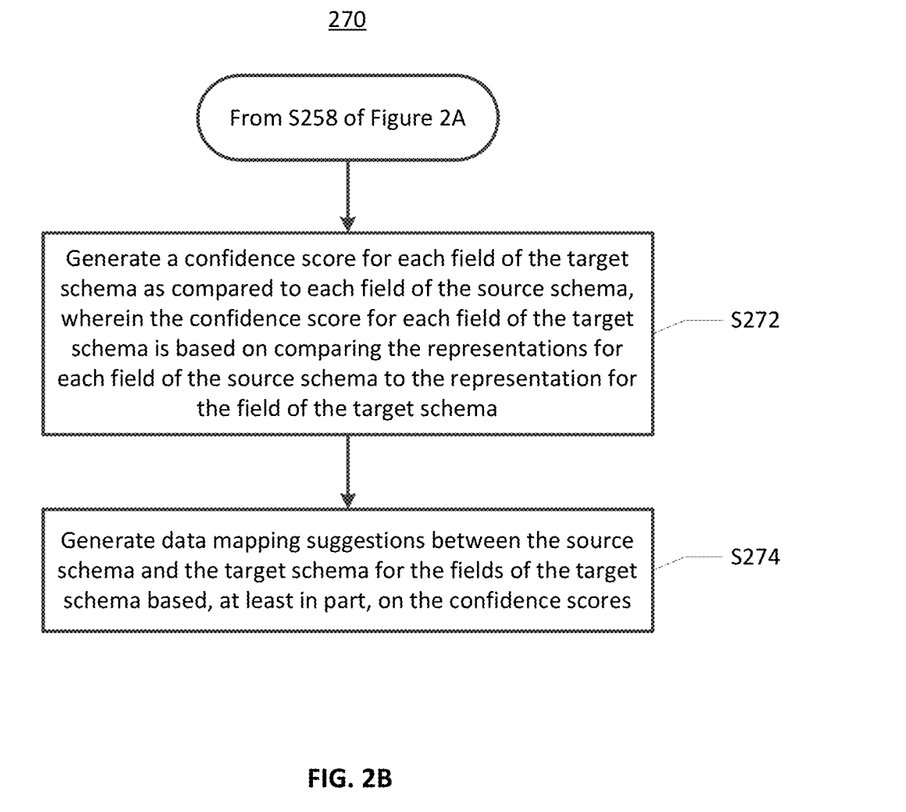

FIG. 2B shows flowchart 270 depicting a computer-implemented method for generating data mapping suggestions, according to embodiment(s) of the present invention. As illustrated in FIG. 2B, in some embodiments, operations for generating data mapping suggestions begin at operation S272 after obtaining representations for each filed of a source schema and for each field of a target schema as described with regard to S258 of FIG. 2A. At operation S272, a computing system (e.g., server computer 200 of FIG. 1 or the like) can generate a confidence score for each field of the target schema as compared to each field of the source schema. The confidence score for each particular field of the target schema is generated based on comparing the representations for each field of the source schema to the representation for the particular field of the target schema. In some embodiments, generating the confidence score for each field of a schema can include calculating an overall confidence score between two fields using cosine similarity.

Processing proceeds to operation S274, where the computing system (e.g., server computer 200 of FIG. 1 or the like) can generate data mapping suggestions between the source schema and the target schema for each of the fields of the target schema based, at least in part, on the confidence scores.

Figure 3:
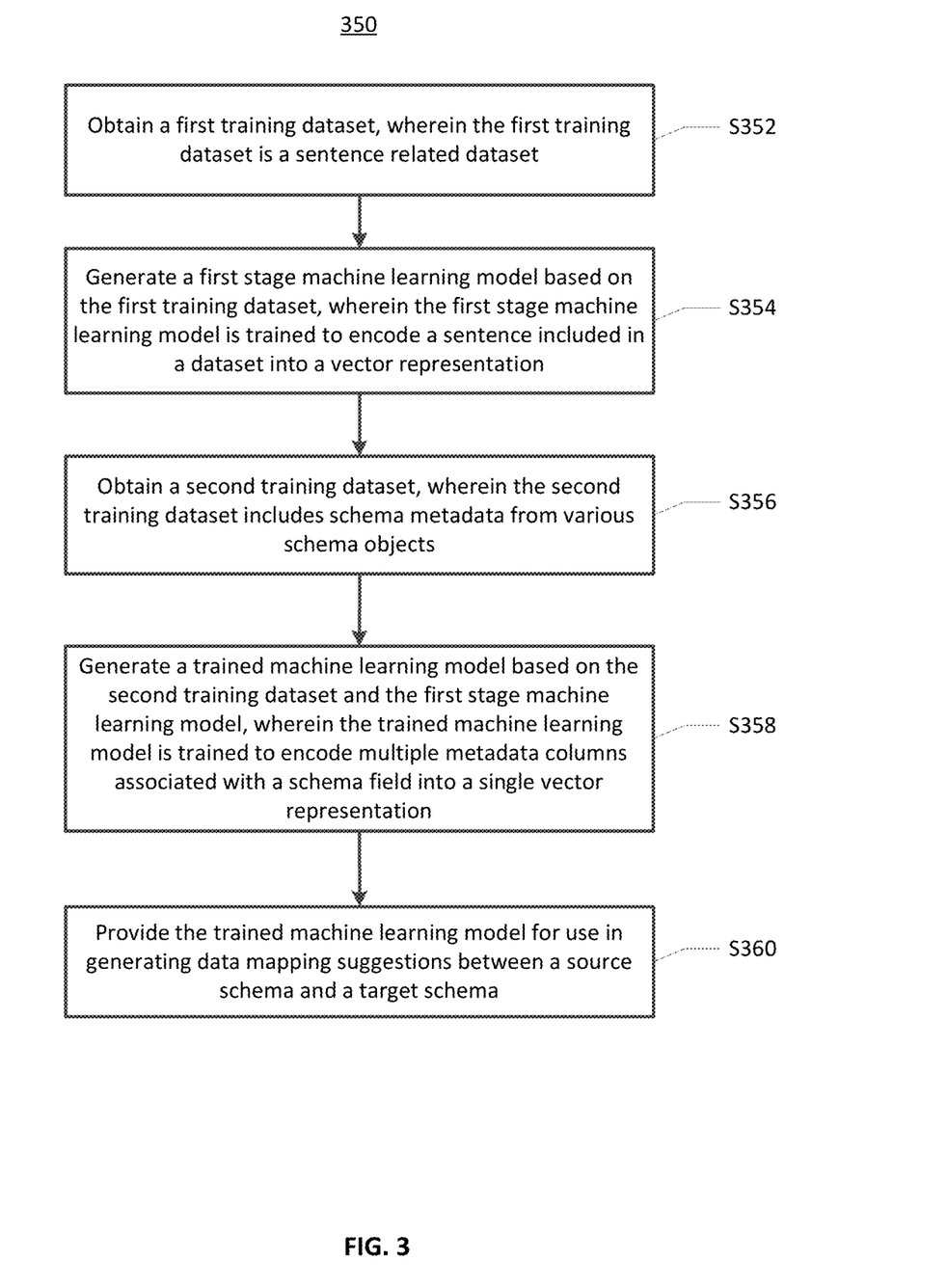
FIG. 3 is a flowchart showing an embodiment of a method performed, at least in part, by the first embodiment system.

FIG. 3 shows flowchart 350 depicting a computer-implemented method for training a machine learning model for use in data mapping, according to embodiment(s) of the present invention. As illustrated in FIG. 3, in some embodiments, operations for training a machine learning model for use in data mapping begin at operation S352, where a computing system (e.g., server computer 200 of FIG. 1 or the like) can obtain a first training dataset. In some embodiments, the first training dataset can be a standard sentence related dataset, such as a standard natural language inference (NLI) dataset.

Processing proceeds to operation S354, where the computing system (e.g., server computer 200 of FIG. 1 or the like) can generate a first stage machine learning model based on the first training dataset. The first stage machine learning model can be trained to encode a sentence that is included in a dataset into a single vector representation.

Processing proceeds to operation S356, where the computing system (e.g., server computer 200 of FIG. 1 or the like) can obtain a second training dataset. The second training dataset can include schema metadata from various schema objects. The schema metadata can include metadata associated with a plurality of fields in the schema that is descriptive of a field, such as field name, display name, description, and/or the like.

Processing proceeds to operation S358, where the computing system (e.g., server computer 200 of FIG. 1 or the like) can generate a trained machine learning model based on the second training dataset and the first stage machine learning model. The trained machine learning model can be trained to encode multiple metadata columns associated with a schema field into a single vector representation for the field.

In some embodiments, a trained machine learning model can be trained to learn domain specific semantic representations relating to a schema domain. In some embodiments, generating the trained machine learning model for to provide for data mapping suggestions does not require the use of any prior schema mapping data.

Processing proceeds to operation S360, where the computing system (e.g., server computer 200 of FIG. 1 or the like) can provide the trained machine learning model for use in generating data mapping suggestions between a source schema and a target schema.

Further Comments and/or Embodiments

Embodiments of the present disclosure can provide for training a machine learning model capable of learning a fixed size representation from multiple metadata present in a single field of a schema object, such as, for example, field name, display name, description, and/or the like. A fixed representation can be a vector that provides a unique representation to a field and may be calculated using the fields various metadata columns. Similar fields may be aligned closer in vector space. In some embodiments, only metadata of existing schema objects may be used in training a model and a model may learn domain specific semantic representations. These representations can then be compared to obtain a confidence score (e.g., a value between 0 and 1) which can be used to score how much two fields are related semantically. In some cases, for example, the relevant information may be hidden in the field name or in in the display name and description. In some cases, this information may only be captured by a semantic union of these metadata. The fixed representation can take care of this semantic metadata union.

In general, schema matching techniques often rely heavily on supervised training techniques based on the actual tabular data, or by using schema pairs already mapped by domain experts. Often, schema matching systems may also have no way of semantic training on multiple metadata present in a single field. Embodiments of the present disclosure can provide field-to-field schema matching that can leverage multi-modal field-level metadata present in schema objects and can train a deep learning algorithm capable of learning domain-specific representations of fields from scarce data. Some embodiments of the present disclosure provide for training without use of any prior customer data, rather relying on metadata from schemas for training. In some embodiments, mapping data is not required for training a model and a model can learn the representations, in an unsupervised manner, directly from the schema metadata. Using only metadata for training is a better-suited approach as it does not need to rely on users agreeing to provide their data.

In some embodiments, a model can combine multiple columns present in the metadata into a single vector representation and can learn domain specific representations. Generally, many sentence to vector models may provide for encoding only a single sentence into a vector. However, in schemas there can be various metadata columns for a single field each of which describe a certain aspect about the field. As such, it may be necessary to effectively combine the representations from the multiple sentences/metadata into one representation. Embodiments of the present disclosure can provide for training a model on multiple related sentences such that the model can learn to combine the representations from multiple sentences into one vector. In some embodiments, a trained model may automatically pickup relevant information from multiple metadata columns and generate a single vector representing the field.

Embodiments of the present disclosure can provide for a model to learn domain specific representations relating to a schema domain. In some embodiments, model training can utilize triplets of related data in an unsupervised fashion to learn sentence representations directly from the schema metadata columns. Training a model on schema metadata can provide for a model to learn better representations.

As one example, an embodiment provides for using a sequence neural network, for example, a gated recurrent units (GRU) neural network, long short term memory (LSTM) neural network, and/or the like, to generate sequence aware embeddings by combining the representations from various metadata present in any field. In some embodiments, a model may be trained using multi-modal inputs and trained in a Siamese fashion (e.g., neural network architecture that runs two pieces of data through identical neural networks with outputs fed to a loss function measuring similarity between outputs). Each schema object may consist of a variety of fields and each field may contain various meta information about that field such as, for example, column name, display name, description, data type, and/or the like. Each of these metadata may provide a high-level description of what that field is about. Embodiments of the present disclosure can provide for finding a vector representation of each of these fields using only the information present in the metadata. This representation information can be used for matching fields between two schemas in a semantic manner.

In an example embodiment, an architecture used to generate embeddings can consist of a byte-pair encoding (BPE) layer followed by an LSTM/GRU layer. The byte-pair encoding layer is used to generate byte pair embeddings for a given sentence. Byte-pair encoding is a widely used approach in language translation for generating sub-word embedding for variable length sentences. In contrast to traditional word embedding, byte-pair embedding can provide an advantage of handling out-of-vocabulary words by splitting such words to smaller sub-words. The GRU layer is recurrent layer that is used to calculate sequence aware representation of the entire sentence. A GRU layer may be less computationally expensive.

Figure 4:
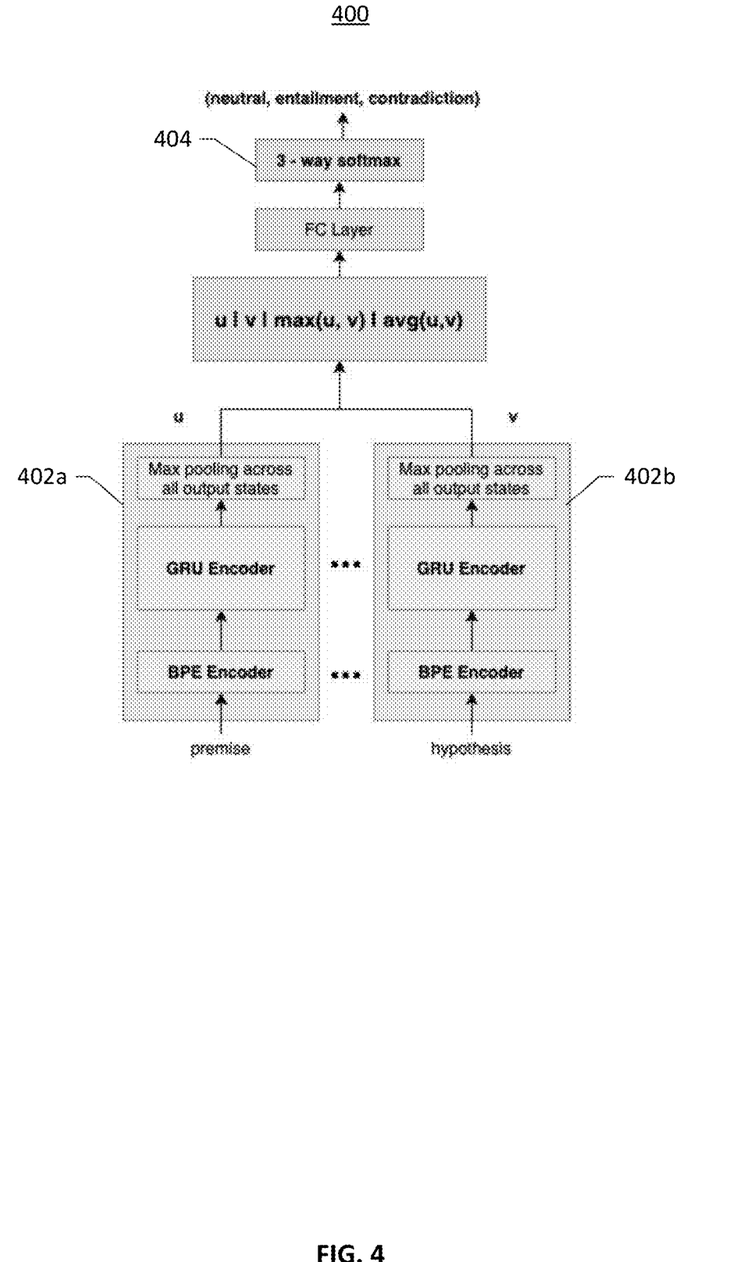
FIG. 4 is a block diagram showing an example of a first stage for training a machine learning model, according to embodiments of the present invention.
Figure 5:
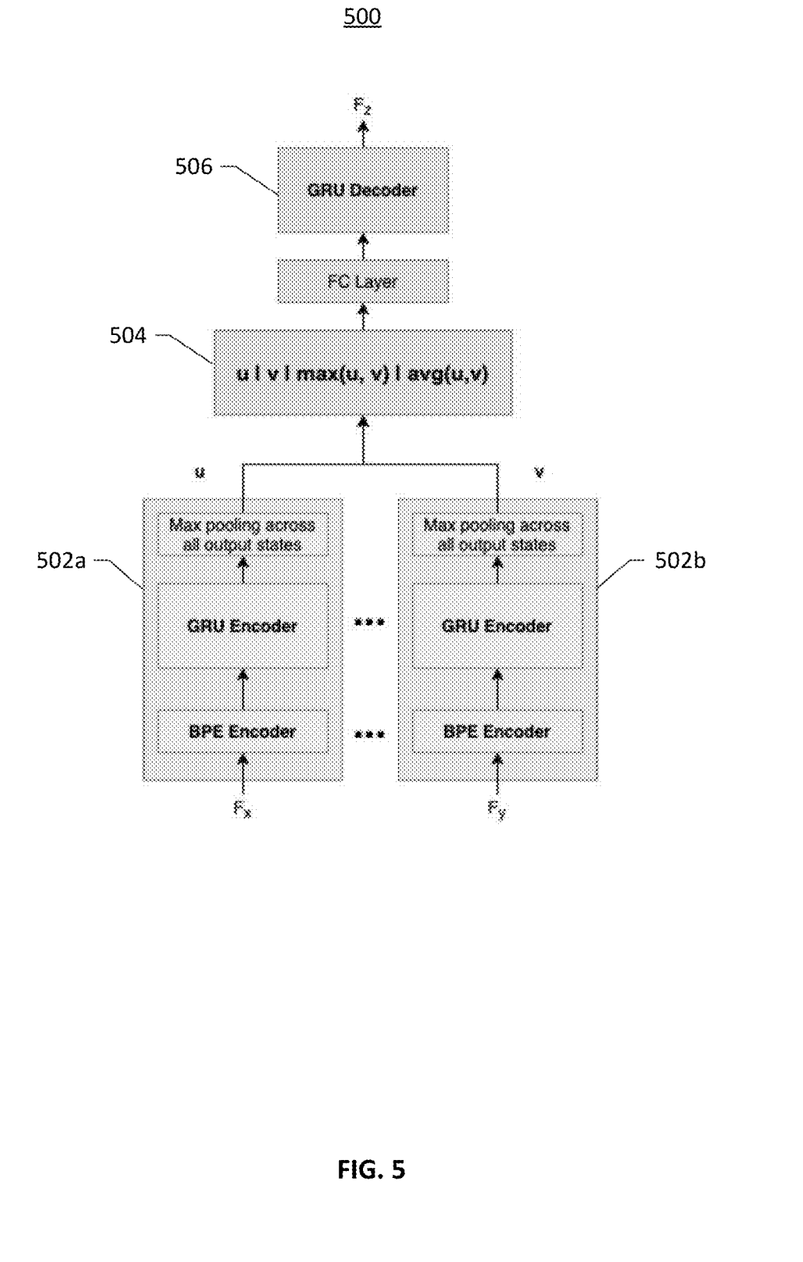
FIG. 5 is a block diagram showing an example of a second stage for training a machine learning model, according to embodiments of the present invention.

FIG. 4 is a block diagram showing an example of a first stage for training a machine learning model, according to embodiments of the present invention. FIG. 5 is a block diagram showing an example of a second stage for training a machine learning model, according to embodiments of the present invention.

In an example embodiment, the machine learning model may be trained in two stages, as illustrated in FIGS. 4 and 5, with the first stage training the model on industry standard natural language inference (NLI) datasets. The output of the first stage is a machine learning model capable of encoding a single sentence into a vector. The second stage does transfer learning on the machine learning model using a custom schema metadata dataset. The second stage generates a final machine learning model that is capable of encoding multiple metadata columns into a single vector.

As illustrated in FIG. 4, first stage training can train a machine learning model 400 on industry standard sentence related datasets. The purpose of the first stage is to first train a machine learning model capable of generating fixed length sentence representations. The training of stage 1 can be done using any standard NLI datasets. The input layers 402a, 402b, etc. use the same encoder to encode a premise and a hypothesis sentence. The output layer 404 predicts a three-way softmax with classification labels: (neutral, entailment, and contradiction). The machine learning model 400 can be trained until the test loss reduces up to a significant value.

As illustrated in FIG. 5, second stage training can be used to further tune the machine learning model trained in the first stage so that the machine learning model 500 can learn the semantics of the data present in schema metadata. For second stage training, a dataset containing schema metadata from various schema objects is obtained. This metadata can include information that describes schema fields in some manner such as, for example, a field description, field name, and/or the like. In some embodiments, the dataset can be extracted from an APIs specification of a connector. As an example, metadata for a sample field in contact object may include:

```
"AccoundID": {
"field name": "AccountID",
"display name": "Account ID",
"description": "ID of the account that's the parent of this contact..."
}
```

In the example embodiment illustrated in FIG. 5, three meta-data columns are being considered: field name (a unique name of the field); display name (the text used to display this field in UI): description (short description about this field). First, a dataset containing fields with similar metadata is obtained. This dataset can be used to further tune the machine learning model after first stage training as described in FIG. 4. In the example embodiment of FIG. 5, the BPE Encoder and GRU Encoder are trained models from the first stage training of FIG. 4. The middle layer 504 calculates element level maximum of the sentence vectors which gives a combined representation of the multiple meta-data columns.

At the input layers 502a, 502b, etc., either of the two sentences ($F_x$, $F_y$), in field name, display name, description, is passed to the machine learning model. The output layer 506 predicts the other sentence, $F_z$, using a sequence decoder layer such as, for example, GRU/LSTM to predict the other sentence. As an example, if field name and description are passed as $F_x$ and $F_y$, display name is predicted as $F_z$. Similarly, if display name and field name are passed in $F_x$ and $F_y$, description is predicted as $F_z$. The machine learning model 500 can be trained until the test loss does not reduce anymore for a given number of epochs.

Figure 6:
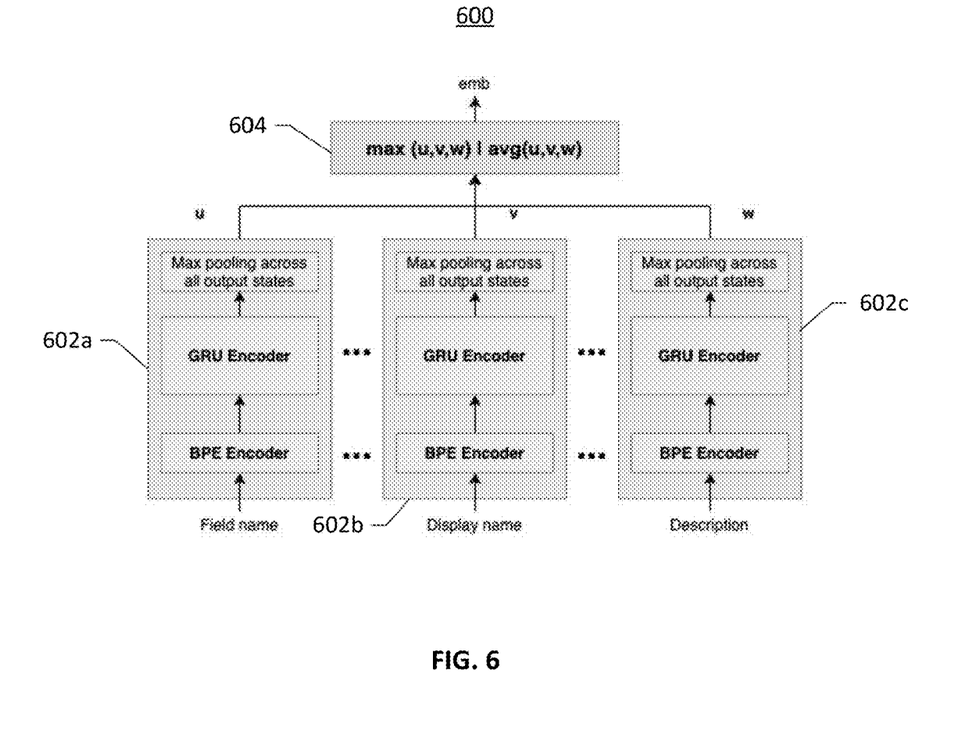
FIG. 6 is a block diagram showing an example of a machine learning model for metadata data mapping assistance, according to embodiments of the present invention.
Figure 7:
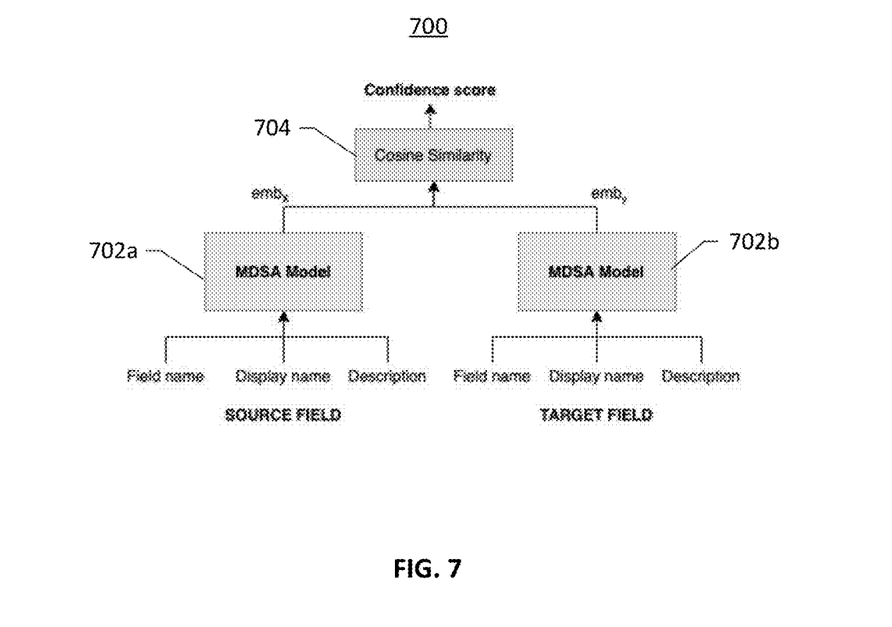
FIG. 7 is a block diagram showing an example of determining field similarity for metadata data mapping assistance, according to embodiments of the present invention.

FIG. 6 is a block diagram showing an example of a machine learning model for metadata based data mapping assistance, according to embodiments of the present invention. FIG. 7 is a block diagram showing an example of determining field similarity for metadata data mapping assistance, according to embodiments of the present invention.

As illustrated in FIG. 6, in an example embodiment, during deployment, a machine learning model 600 can be structured to leverage the multi-modal information from all or some of the metadata columns in a schema field. FIG. 6 illustrates how the trained machine learning model 600 can be structured to generate fixed size vectors from a combination of metadata, such as field name, display name, and description obtained at input layers 602a, 602b, 602c, etc.

In the example embodiment of FIG. 6, the machine learning model 600 can generate a fixed size vector embedding (e.g., field representation, etc.) which uniquely describes a combination of the field name, display name, and description columns of a particular field of a schema as output from the output layer 604. To calculate a field-to-field similarity for use in data mapping, the metadata of each and every field can be independently passed into the machine learning model 600 (e.g., at input layers 602a, 602b, 602c, etc.) to calculate the vector embedding (e.g., emb) for that field. These vectors (e.g., representations, etc.) can then be used to calculate an overall confidence score between two fields by using cosine similarity, as illustrated in FIG. 7.

In the example embodiment 700 illustrated in FIG. 7, source schema fields can be provided to a trained model 702a and target schema fields can be provided to a trained model 702b to generate the vector embeddings (e.g., representations) $emb_x$ and $emb_y$. At layer 704, a cosine similarity can be determined for each target field representation and source field representation. Matches can then be generated by creating a confidence score matrix of every field in target schema with every field in source schema. Top data mapping suggestions for fields in target schema can be provided by filtering the fields with topmost confidence scores from source schema.

Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method for data or schema mapping, the computer-implemented method comprising:
    obtaining, by a server computer, source schema metadata, wherein the source schema metadata is associated with fields of a source schema;
    obtaining, by the server computer, target schema metadata with a target schema, wherein the target schema metadata is associated with fields of a target schema;
    determining, by the server computer, for each field of the source schema and each field of the target schema, a representation for each field based, at least in part, on the source schema metadata or the target schema metadata associated with each field, and generating schema field representations for a dynamic object schema, wherein the dynamic object schema enable extending schemas of an existing object, and wherein the determining of the representation for each field of the source schema and each field of the target schema comprises:
        training a machine learning model, wherein training the machine learning model comprises:
            obtaining a first training dataset;
            generating a first stage machine learning model based on the first training dataset, wherein the first stage machine learning model is trained to encode a sentence included in a dataset into a vector representation;
            obtaining a second training dataset, wherein the second training dataset includes schema metadata from various schema objects;
            generating a trained machine learning model based on the second training dataset and the first stage machine learning model, wherein the trained machine learning model is trained to encode sentences associated with metadata columns of a schema field into a single vector representation, wherein an input layer of the machine learning model utilizes a same encoder to encode a premise and a hypothesis; and
            utilizing triplets of related data in an unsupervised fashion to learn sentence representations directly from the metadata columns;
    generating, through a sequence neural network, sequence aware embeddings based on the representation for each field by combining the representations from the source schema metadata and the target schema metadata; and
    providing, by the server computer, the representation for each field of the source schema and the representation for each field of the target schema for use in generating data mappings between the source schema and the target schema.

2. The computer-implemented method of claim 1, wherein the representation for each field of the source schema and each field of the target schema comprises a fixed size vector embedding that describes a combination of metadata associated with a particular field of the source schema or the target schema.

3. The computer-implemented method of claim 1, further comprising:
    calculating field-to-field matches between the source schema and the target schema using the representations for the fields of the source schema and the target schema, wherein the representations are generated based on multiple metadata columns associated with a schema field; and
    generating data mapping suggestions between fields of the source schema and the target schema based on the field-to-field matches.

4. The computer-implemented method of claim 1, wherein the representations are determined for fields of a dynamic object schema.

5. The computer-implemented method of claim 1, wherein the determining the representation for each field of the source schema and each field of the target schema comprises:
    providing the source schema metadata or the target schema metadata associated with each field individually as input to a machine learning model, the machine learning model having been trained to generate the representation for each field based on one or more metadata columns associated with each field; and
    receiving, for each field as output from the machine learning model, a vector representation that describes a combination of the one or more metadata columns associated with each field as the representation for each field and be used as the representation for that field in determining matches between fields of the source and target schemas for use in data mapping.

6. The computer-implemented method of claim 5, wherein the machine learning model is trained to identify relevant information from multiple metadata columns associated with a schema field to generate a single vector representation for the schema field.

7. The computer-implemented method of claim 1, further comprising:
    generating a confidence score for each field of the target schema as compared to each field of the source schema, wherein the confidence score for each field of the target schema is based on comparing the representations for each field of the source schema to the representation for the field of the target schema, and an overall calculated score between two fields using cosine similarity; and
    generating data mapping suggestions between the source schema and the target schema for the fields of the target schema based, at least in part, on the confidence scores.

8. The computer-implemented method of claim 7, wherein the generating the confidence score for each field of the target schema comprises calculating an overall confidence score between two fields using cosine similarity.

9. A computer-implemented method comprising:
    determining, by a server computer, for each field of a source schema and each field of a target schema, a representation for each field based, at least in part, on source schema metadata or target schema metadata associated with each field, and generating schema field representations for a dynamic object schema, wherein the dynamic object schema enable extending schemas of an existing object, and wherein the determining of the representation for each field of the source schema and each field of the target schema comprises:
training a machine learning model, wherein training the machine learning model comprises:
obtaining a first training dataset, wherein the first training dataset is a sentence related dataset;
generating a first stage machine learning model based on the first training dataset, wherein the first stage machine learning model is trained to encode a sentence included in a dataset into a vector representation, wherein the machine learning model generates fixed length sentence representations by utilizing a natural language inference dataset;
obtaining a second training dataset, wherein the second training dataset includes schema metadata from various schema objects;
generating a trained machine learning model based on the second training dataset and the first stage machine learning model, wherein the trained machine learning model is trained to encode metadata columns associated with a schema field into a single vector representation and to learn domain specific semantic representations relating to a schema domain, wherein an input layer of the machine learning model utilizes a same encoder to encode a premise and a hypothesis; and
utilizing triplets of related data in an unsupervised fashion to learn sentence representations directly from the metadata columns
providing the trained machine learning model for use in generating data mapping suggestions between the source schema and the target schema.

10. The computer-implemented method of claim 9, wherein the generating the trained machine learning model for use in generating data mapping does not require any prior schema mapping data.

11. The computer-implemented method of claim 9, wherein the second training dataset includes schema metadata that describes fields included in a schema.

12. A computer program product for data or schema mapping comprising a computer readable storage medium having stored thereon:
program instructions programmed to obtain source schema metadata, wherein the source schema metadata is associated with fields of a source schema;
program instructions programmed to obtain, by a server computer, target schema metadata with a target schema, wherein the target schema metadata is associated with fields of a target schema;
program instructions programmed to determine, by the server computer, for each field of the source schema and each field of the target schema, a representation for each field based, at least in part, on the source schema metadata or the target schema metadata associated with each field, and generating schema field representations for a dynamic object schema, wherein the dynamic object schema enable extending schemas of an existing object, and wherein the determining of the representation for each field of the source schema and each field of the target schema comprises:
program instructions programmed to train a machine learning model to learn domain specific semantic representations relating to a schema domain, wherein training the machine learning model comprises:
program instructions programmed to obtain a first training dataset;
program instructions programmed to generate a first stage machine learning model based on the first training dataset, wherein the first stage machine learning model is trained to encode a sentence included in a dataset into a vector representation;
program instructions programmed to obtain a second training dataset, wherein the second training dataset includes schema metadata from various schema objects;
program instructions programmed to generate a trained machine learning model based on the second training dataset and the first stage machine learning model, wherein the trained machine learning model is trained to encode sentences associated with metadata columns of a schema field into a single vector representation, wherein an input layer of the machine learning model utilizes a same encoder to encode a premise and a hypothesis, and wherein the trained machine learning model does not require use of prior schema mapping data; and
utilizing triplets of related data in an unsupervised fashion to learn sentence representations directly from the metadata columns;
program instructions programmed to generating, through a sequence neural network, sequence aware embeddings based on the representation for each field by combining the representations from the source schema metadata and the target schema metadata; and
program instructions programmed to provide, by the server computer, the representation for each field of the source schema and the representation for each field of the target schema for use in generating data mappings between the source schema and the target schema.

13. The computer program product of claim 12, wherein the representation for each field of the source schema and each field of the target schema comprises a fixed size vector embedding that describes a combination of metadata associated with a particular field of the source schema or the target schema.

14. The computer program product of claim 12, the computer readable storage medium having further stored thereon:
program instructions programmed to calculate field-to-field matches between the source schema and the target schema using the representations for the fields of the source schema and the target schema, wherein the representations are generated based on multiple metadata columns associated with a schema field; and
program instructions programmed to generate data mapping suggestions between fields of the source schema and the target schema based on the field-to-field matches.

15. The computer program product of claim 12, wherein the program instructions programmed to determine, for each field of the source schema and each field of the target schema, the representation for each field, further comprise:
program instructions programmed to provide the source schema metadata or the target schema metadata associated with each field individually as input to a machine learning model, the machine learning model having been trained to generate the representation for each field based on one or more metadata columns associated with each field; and program instructions programmed to receive, for each field as output from the machine learning model, a vector representation that describes a combination of the one or more metadata columns associated with each field as the representation for each field.

16. The computer program product of claim 15, wherein the machine learning model is trained to identify relevant information from multiple metadata columns associated with a schema field to generate a single vector representation for the schema field.

17. The computer program product of claim 12, the computer readable storage medium having further stored thereon:

program instructions programmed to generate a confidence score for each field of the target schema as compared to each field of the source schema, wherein the confidence score for each field of the target schema is based on comparing the representations for each field of the source schema to the representation for the field of the target schema; and program instructions programmed to generate data mapping suggestions between the source schema and the target schema for the fields of the target schema based, at least in part, on the confidence scores.

18. The computer program product of claim 17, wherein the generating the confidence score for each field of the target schema comprises calculating an overall confidence score between two fields using cosine similarity.

* * * * *